(No Model.)

C. W. AYRES & J. G. DUNTON.
LENS GRINDING APPARATUS.

No. 575,584. Patented Jan. 19, 1897.

Witnesses:
M. R. Remley
[signature]

Inventors:
Conway W. Ayres
John G. Dunton by Higdon & Higdon
Atty's

UNITED STATES PATENT OFFICE.

CONWAY W. AYRES AND JOHN G. DUNTON, OF KANSAS CITY, MISSOURI, ASSIGNORS TO B. G. RHODES AND A. J. RHODES, OF SAME PLACE.

LENS-GRINDING APPARATUS.

SPECIFICATION forming part of Letters Patent No. 575,584, dated January 19, 1897.

Application filed January 27, 1896. Serial No. 576,922. (No model.)

*To all whom it may concern:*

Be it known that we, CONWAY W. AYRES and JOHN G. DUNTON, of Kansas City, Jackson county, Missouri, have invented certain new and useful Improvements in Lens-Grinding Apparatus, of which the following is a full, clear, and exact description, reference being had to the accompanying drawings, forming a part thereof.

Our invention relates to lens-grinding apparatus.

Heretofore it has been the custom for lens-manufacturers or opticians in manufacturing lenses provided each with a distance-field and a reading-field to grind separate pieces of glass to the required curvature, either convex or concave, as the case may be, to produce the field required and then to unite them in the form of a single lens in a well-known manner, and while the advantage of producing such double lenses in a single piece of glass has been recognized it has been considered practically impossible of accomplishment. Our invention is designed to accomplish this very desirable object, and that it is a practical and commercial success will be obvious from a careful examination of the following specification, taken in connection with the accompanying illustrations.

The novel and patentable features of the apparatus are embraced in the appended claims.

Figure 1:
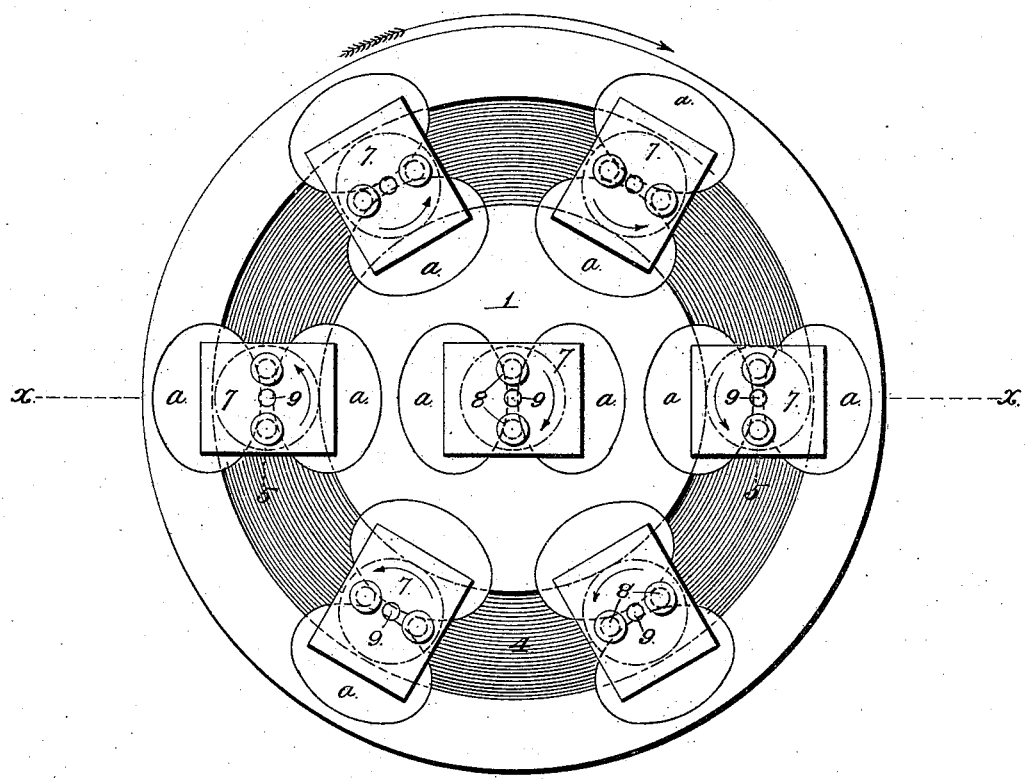
Figure 2:
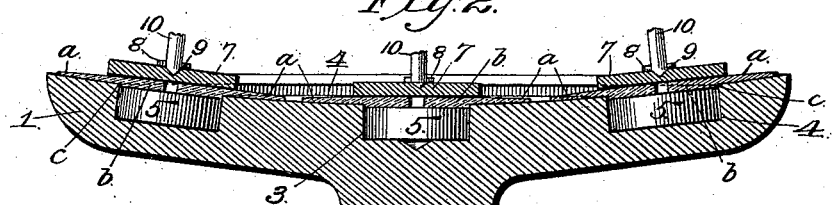
Figure 3:
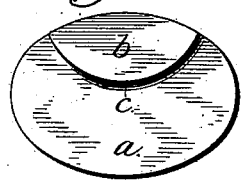
Figure 4:
Figure 5:
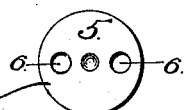

In the drawings, Figure 1 represents a plan view of a lens-grinding apparatus embodying our invention. Fig. 2 represents a vertical section of the same, taken on the line *x x*. Fig. 3 represents a plan view of a lens provided with a distance and with a reading field and constructed of a single piece of glass. Fig. 4 is an edge view of the same. Fig. 5 represents a detail view of part of the apparatus.

In the said drawings, 1 designates a grinding-disk, which is mounted rigidly on a revolving shaft, as shown, or the disk may be mounted and rotated in any other suitable manner. Said disk, as shown in the drawings, has its upper or grinding face concave, and therefore produces in operation convex surfaces upon the glass or lens operated upon; but it is to be understood, of course, that the disks may be provided with convex grinding-faces to produce concave surfaces or may have plano grinding-faces to produce plano surfaces, as will be readily understood. The disk is provided centrally with a circular cavity or recess 3 and with a groove 4, extending or arranged concentrically around the axis of rotation of the disk.

The devices used in connection with the disks which carry the lenses operated upon comprise each a disk 5, of diameter slightly smaller than the diameter of the central opening 3 or the width of the annular groove 4 and in thickness does not equal the depth of said opening or groove, and this disk is provided at diametrically opposite points with the holes or recesses 6, which holes or recesses in practice are engaged by pins projecting from the plate 7, which pins are numbered 8, and said plate is provided centrally with a bearing-cavity 9, engaged by a pin 10, held downward, preferably, by a yielding pressure in any suitable or preferred manner, as the function of these pins is simply to provide a pivot on which the lens-carrying devices may rotate and also to maintain said devices in their proper positions relative to each other.

In practice the plate 7 is inverted and coated with wax or other adhesive substance, and a pair of ordinary lenses having only a single or reading field is placed upon said inverted plate until their opposing edges bear against the pins 8, as indicated by dotted lines in Fig. 1, and they are pressed firmly down upon the adhesive material referred to. The disk or roller 5, after being coated with a similar adhesive substance on its upper surface, is now inverted and placed upon said lenses with the pins of said inverted plate projecting upwardly through the holes or apertures 6, so as to secure said lenses firmly and immovably in the position shown in Figs. 1 and 2 relative to their holding devices, that is, to the disk 5 and the plate 7. The device is now inverted, or, rather, righted, as it was inverted for convenience of securing the lenses in place, and it is placed upon the grinding-disk with the disk or roller 5 engaging the opening or cavity 3 of the same, or with said disk or roller engaging the annular groove 4. By this arrangement it is obvious that the surfaces of the lenses to be ground are thus at the same side which projects beyond the margin of the disk or roller 5, or, in other words, the arcs of the lenses, which are those portions held between the plate 7 and the outer margin of the disk 5, and which represent the reading-fields, are untouched by the grinding-disk, while those portions which are exterior to a line coincident with the margin of said disk or roller are the fields which are to be ground for distance purposes. The distance-field in the drawings is lettered $a$ and the reading-field is lettered $b$. After the holders provided with the lenses to be ground are arranged within the circular opening and the groove they are adjusted laterally, so that the disk or roller 5 shall frictionally engage either the inner or outer shoulder of the groove and at any point the wall of the opening 3, and they are maintained absolutely and reliably in such position by the pins 10, or in any other suitable or preferred manner, as the means for maintaining the holders in such position does not form a part of our present invention, it being sufficient to state that they are so held, and immediately they are properly so arranged the grinding-disk is revolved in the customary manner at a high rate of speed, in practice about seven hundred and fifty revolutions to the minute, and owing to the fact that the disks are held into frictional contact with the walls of said opening or groove, it is obvious that they will be revolved with great rapidity by such frictional contact, and in such rotation will cause the lenses to be ground to the proper degree in a short time. In the grinding operation of course emery or an equivalent substance is employed in the customary manner.

From the foregoing it is obvious that the inner set of lenses travel entirely upon the inner surface of the grinding-disk, while the concentric series of lenses in their rotation successively come in contact with the surface of the grinding-disk inward and outward of the groove, as will be readily understood. When the disk is revolved in the direction indicated by the arrow in Fig. 1, the lens-holders rotate, as indicated by their respective arrows. If the rotation of the disk be reversed or if the friction disks or rollers 5 are caused to engage the opposite wall of the groove, the lens-holders will rotate in the opposite direction, as will be readily understood. As the disks are ground by the operation described shoulders $c$ are formed coincident with the margin of the disks or rollers 5, which represents the division-line between the inner or reading-field and the outer or distance-field of the lenses, and said fields are polished in the customary manner and are then ready for use.

From the above description it is apparent that we have produced apparatus for the production in a single lens of two fields, which is simple, durable, and inexpensive of manufacture, and it is to be understood that, although we have described holding devices for lenses we do not confine ourselves to the use of such devices, but claim, broadly, a grinding-disk provided with an opening or a groove, or both, in combination with any suitable devices for holding the lens in the proper position relative to said grinding-disk, whether such devices revolve the lenses or hold them stationary upon the revolving disk described.

It is to be understood that we reserve the right to make all such changes in the apparatus as do not involve a departure from the spirit and scope of our invention.

Having thus described the invention, what we claim as new, and desire to secure by Letters Patent, is—

1. An apparatus for grinding lenses, comprising a rotating disk provided centrally with a circular opening or recess, and a lens-holder, provided with a circular disk or roller which fits within the opening or recess of the disk and frictionally engages the wall of the same, substantially as and for the purpose set forth.

2. An apparatus for grinding lenses, comprising a rotating disk provided with a circular groove, and a holder comprising a pair of plates between which the lenses are firmly secured; one of said plates being in the form of a disk or roller which fits within said groove and frictionally engages one or the other wall of the same, whereby the lenses resting upon the grinding-face of the disk are revolved, substantially as described.

3. In a lens-grinding apparatus, the combination with a grinding-disk provided with a circular opening or groove, of a lens-holder, consisting of an apertured disk or roller which fits within said opening or groove, a plate arranged above the same and provided with pins which engage said holes or apertures, lenses secured immovably between and relative to said plate and said disk or roller, and a pin axially engaging said holder to maintain it in its proper position relative to the rotating grinding-disk, substantially as described.

In testimony whereof we affix our signatures in presence of two witnesses.

CONWAY W. AYRES.
JOHN G. DUNTON.

Witnesses:
M. R. REMLEY,
G. Y. THORPE.